(12) United States Patent
Altshuler et al.

(10) Patent No.: US 8,028,291 B2
(45) Date of Patent: Sep. 27, 2011

(54) METHOD AND COMPUTER PROGRAM PRODUCT FOR JOB SELECTION AND RESOURCE ALLOCATION OF A MASSIVELY PARALLEL PROCESSOR

(75) Inventors: Yaniv Altshuler, Rishon LeZion (IL); Tamar Domany, Kiryat Tivon (IL); Oleg Goldshmidt, Herzlia (IL); Yehuda Naveh, Haifa (IL); Edi Shmueli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 11/625,352

(22) Filed: Jan. 22, 2007

(65) Prior Publication Data
US 2008/0178187 A1    Jul. 24, 2008

(51) Int. Cl.
*G06F 9/46* (2006.01)
*G06F 17/10* (2006.01)

(52) U.S. Cl. ............................. 718/104; 703/2
(58) Field of Classification Search .............. 718/104; 703/2
See application file for complete search history.

(56) References Cited

U.S. PATENT DOCUMENTS

| | | | |
|---|---|---|---|
| 5,392,430 A | 2/1995 | Chen et al. | |
| 7,596,788 B1 * | 9/2009 | Shpigelman | 718/100 |
| 2006/0020939 A1 * | 1/2006 | Fellenstein et al. | 718/1 |

OTHER PUBLICATIONS

A. W. Mualem and D. G. Feitelson, "Utilization, predictability, workloads, and user runtime estimates in scheduling the IBM SP2 with backfilling" IEEE Trans. Parallel and Distributed Syst. 12(6), pp. 529-543, 2001.

J. Skovira, W. Chan, H. Zhou, and D. Lifka, "The Easy LoadLeveler API Project". JSSPP 1996 pp. 41-47; D. Lifka, "The ANL/IBM SP Scheduling System", JSSPP 1995 pp. 295-303.
Edi Shmueli, Dror G. Feitelson "Backfilling with Lookahead to Optimize the Performance of Parallel Job Scheduling" JSSPP 2003 pp. 228-251.
S. Yoo et al., "An Efficient Task Allocation Scheme for 2D Mesh Architectures", IEEE Trans. on Parallel and Distributed systems, v. 8(9), pp. 934-942, 1997.
D. Das Sharma and D. K. Pradhan, "A Fast and Efficient Strategy for Submesh Allocation in Mesh-Connected Parallel Computers", IEEE Symp. parallel and Distributed Processing, pp. 682-689, 1993.
D. Das Sharma and D. K. Pradhan, "Submesh Allocation in Mesh Multicomputers Using Busy List: A Best-Fit Approach with Complete Recognition Capability", Journal of Parallel and Distributed Computing, v. 36, pp. 106-118, 1996.
D. Das Sharma and D. K. Pradhan, "Job Scheduling in Mesh Multicomputers", IEEE Trans. in Parallel and Distributed Systems,v. 9(1), pp. 57-70, 1998.
T. Liu et al., "A Submesh Allocation Scheme for Mesh-Connected Multiprocessor Systems", Proc. 1995 Int'l Conf. Parallel Processing, v. 2, pp. 159-163, 1995.
G. Kim and H. Yoon,"On Submesh Allocation for Mesh Multicomputers: A Best-Fit Allocation and a Virtual Submesh Allocation for Faulty Meshes", IEEE Trans. on Parallel and Distributed Systems, v. 9(2), 1998.

(Continued)

*Primary Examiner* — Meng A An
*Assistant Examiner* — Blake Kumabe

(57) ABSTRACT

A method for job selection and resource allocation of massively parallel processors, the method includes: providing to a constraint satisfaction problem solver multiple domains, variables, and constraints representative of a massively parallel processor, of queued job requests and of jobs being processed by the massively parallel processor, and generating, by the constraint satisfaction problem solver a result representative of multiple jobs to be executed, at least partially in parallel, by multiple resources of the massively parallel processor.

20 Claims, 5 Drawing Sheets

OTHER PUBLICATIONS

E. Krevat, J. G. Castanos, and J. E. Moreira, "Job Scheduling for the BlueGene/L System", Job Scheduling Strategies for Parallel Processing workshop, Lecture Notes in Computer Science v. 2537, pp. 38-54, Springer-Verlag, 2002.

Y. Aridor et al., "Multi-Toroidal Interconnects: Using Additional Communication Links to Improve Utilization of Parallel Computers", JSSPP 2004 pp. 72-88.

W.P.M. Nuijten and E.H.L. Aarts, "A computational Study of Constraint Satisfaction for Multiple Capacitated Job Shop Scheduling", European Journal of Operational Research, vol. 90, Issue 2, Apr. 19, 1996, pp. 269-284.

V. Kumar, "Algorithms for constraint satisfaction problems: A survey", AI Magazine, 13, 32-41 (1992).

D. Lifka, "The ANL/IBM SP Scheduling System", JSSPP 1995 pp. 295-303.

W. W. Chu et al., "Solving the generalized job shop scheduling problem via temporal constraint propagation", Knowledge Based Computer Systems, 1990, p. 29-38.

* cited by examiner

METHOD AND COMPUTER PROGRAM PRODUCT FOR JOB SELECTION AND RESOURCE ALLOCATION OF A MASSIVELY PARALLEL PROCESSOR

FIELD OF THE INVENTION

The present invention relates to methods, systems and computer program products for job selection and resource allocation of a massively parallel processor.

BACKGROUND OF THE INVENTION

A Massively Parallel Processor can include a large number (even thousands) of central processing units possibly grouped into nodes. A well known massively parallel processor is the BlueGene/L™ of International Business Machines™ of Armonk, N.Y.

A massively parallel processor is expected to execute multiple computer tasks (jobs) in parallel by using multiple processing units. Usually, multiple users can send requests to execute various jobs. These requests are queued in multiple queues and a scheduler selects (i) which head-of-queue job to execute (job selection), and (ii) which resources shall participate in the execution of the job (resource allocation).

These two decisions are traditionally executed by using mutually independent algorithms. Typically the job selection is responsive to various priorities while the resource allocation is responsive to the topology of the massively parallel processor.

The scheduler, and especially the job selection, can be responsive to various parameters including user priority, group of user priority, job priority, time of arrival of the request to the job, and the like. The performance of the massively parallel processor is largely dependent upon the efficiency of the scheduler. A badly designed scheduler can use only a fraction of the massively parallel processor resources, and can otherwise utilize the massively parallel processor in a non-efficient (also time-wise) manner.

Various algorithms were developed for job selection. One prior art method for job selection is known as backfilling. The following papers, all being incorporated herein by reference, illustrates some backfilling methods: A. W. Mualem and D. G. Feitelson, "Utilization, predictability, workloads, and user runtime estimates in scheduling the IBM SP2 with backfilling" IEEE Trans. Parallel and Distributed Syst. 12(6), pp. 529-543, 2001; J. Skovira, W. Chan, H. Zhou, and D. Lifka, "The EASY LoadLeveler API Project". JSSPP 1996 pp. 41-47; D. Lifka, "The ANL/IBM SP Scheduling System", JSSPP 1995 pp. 295-303; and Edi Shmueli, Dror G. Feitelson "Backfilling with Lookahead to Optimize the Performance of Parallel Job Scheduling" JSSPP 2003 pp. 228-251.

There are various resource allocation method that are usually used when the topology of the massively parallel processor are not trivial, some being illustrated in the following papers, all being incorporated herein by reference: "An Efficient Task Allocation Scheme for 2D Mesh Architectures", S. Yoo et al., IEEE Trans. on Parallel and Distributed systems, v. 8(9), pp. 934-942, 1997; "A Fast and Efficient Strategy for Submesh Allocation in Mesh-Connected Parallel Computers", D. Das Sharma and D. K. Pradhan, IEEE Symp. parallel and Distributed Processing, pp. 682-689, 1993; "Submesh Allocation in Mesh Multicomputers Using Busy List: A Best-Fit Approach with Complete Recognition Capability", D. Das Sharma and D. K. Pradhan, Journal of Parallel and Distributed Computing, v. 36, pp. 106-118, 1996; "Job Scheduling in Mesh Multicomputers", D. Das Sharma and D. K. Pradhan, IEEE Trans. in Parallel and Distributed Systems, v. 9(1), pp. 57-70, 1998; "A Submesh Allocation Scheme for Mesh-Connected Multiprocessor Systems", T. Liu et al., Proc. 1995 Int'l Conf. Parallel Processing, v. 2, pp. 159-163, 1995; "On Submesh Allocation for Mesh Multicomputers: A Best-Fit Allocation and a Virtual Submesh Allocation for Faulty Meshes", G. Kim and H. Yoon, IEEE Trans. on Parallel and Distributed Systems, v. 9(2), 1998; "Job Scheduling for the BlueGene/L System", E. Krevat, J. G. Castanos, and J. E. Moreira, Job Scheduling Strategies for Parallel Processing workshop, Lecture Notes in Computer Science v. 2537, pp. 38-54, Springer-Verlag, 2002; and "Multi-Toroidal Interconnects: Using Additional Communication Links to Improve Utilization of Parallel Computers", Y. Aridor et al., JSSPP 2004 pp. 72-88.

These resource allocation algorithms can be categorized into two groups named "First-Fit" and "Best-Fit". The basic difference between the various resource allocation algorithms is in the way, or the order, the resources of the massively parallel processor are scanned, and in the heuristics used to decide the "best".

There is a need to provide efficient systems, methods and computer program product for job selection and resource allocation of a massively parallel processor.

SUMMARY OF THE PRESENT INVENTION

A method for job selection and resource allocation of massively parallel processors, the method includes: providing to a constraint satisfaction problem solver multiple domains, variables, and constraints representative of a massively parallel processor, of queued job requests and of jobs being processed by the massively parallel processor, and generating, by the constraint satisfaction problem solver a result representative of multiple jobs to be executed, at least partially in parallel, by multiple resources of the massively parallel processor.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

In the following description, reference is made to the accompanying drawings which form a part hereof and which illustrate several implementations of the present invention. It is understood that other implementations may be utilized and structural and operational changes may be made without departing from the scope of the present invention.

The invention provides methods, systems and computer program products that do not concentrate only on head-ofqueue job requests, are not tailored to specific massively parallel processor topology, are relatively simple and intuitive and are not strongly based on heuristics, in contrast to some prior art methods.

Figure 1:
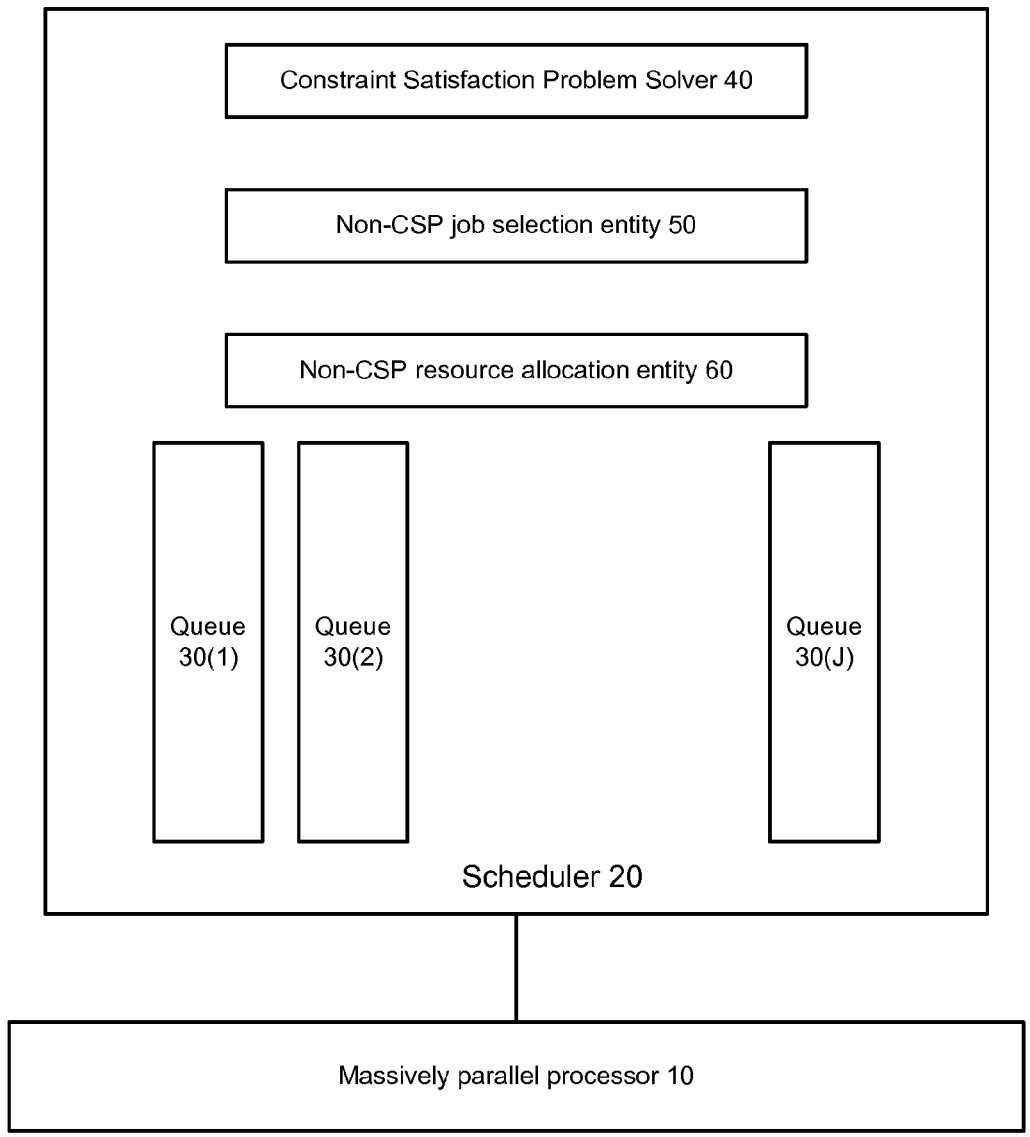
FIG. 1 illustrates a massively parallel processor and a scheduler, according to an embodiment of the invention.

FIG. 1 illustrates massively parallel processor 10 and scheduler 20, according to an embodiment of the invention. Massively parallel processor 10 includes a large number of nodes that can be arranged as (or mapped to) a multi-dimensional array, conveniently as a K-dimensional array whereas K is a positive integer that exceeds two. This is not necessarily so. Massively parallel processor 10 includes multiple nodes, each node having one or more central processors, memory units network connections and the like. Nodes, as well as other units such as switches and links can be regarded as the resources of massively parallel processor 10.

The multi-dimensional array is illustrated (for convenience of explanation only) in the following description as a being a three dimensional array that is characterized by x, y and z dimensions.

Scheduler 20 can be connected to multiple users by various means (including one or more networks) and can include multiple queues (such as queues 30(1)-30(J)) for storing requests to execute jobs. Conveniently, scheduler 20 includes a constraint satisfaction problem solver (CSPS) 40 adapted to apply constraint satisfaction problem (CSP) techniques in order to select jobs (including non head-of-queue job requests) and to determine the resource allocation of the massively parallel processor.

CSP techniques and CSPS of various types (including, for example, stochastic CSP solvers and systematic CSP solvers) are known in the art. CSP methods and CSP solvers are illustrated, for example, by the following papers, all being incorporated by reference: "A computational Study of Constraint Satisfaction for Multiple Capacitated Job Shop Scheduling", W. P. M. Njijen and E. H. L. Aarts, European Journal of Operational Research, Volume 90, Issue 2, 19 Apr. 1996, Pages 269-284; and "Algorithms for constraint satisfaction problems: A survey", V. Kumar, AI Magazine, 13, 32-41 (1992).

Conveniently, CSPS 40 performs both job selection and resource allocation simultaneously.

According to an embodiment of the invention the scheduler 20 can apply only CSP techniques but according to another embodiment of the invention the scheduler 20 can apply both CSP techniques and other job selection and resource allocation techniques, as illustrated by optional non-CSP job selection entity 50 and the optional non-CSP resource allocation entity 60.

Scheduler 20 can receive or define a workload management selection criterion. This criterion can determine when a CSP based solution or a non-CSP based solution (such as but not limited to backfilling) should be applied. The non-CSP solution is applied on head-of queue jobs while the CSP solution is applied on more jobs than head-of-queue jobs and can be conveniently applied on all queued job requests.

Conveniently, if a very fast response time is required most of the job selection is performed using the non-CSP job selection entity 50 and the optional non-CSP resource allocation entity 60, but every predefined interval CSPS 40 is utilized. In addition, the non-CSP job selection entity 50 and the optional non-CSP resource allocation entity 60 can be responsive to the results generated by CSPS 40. For example, backfill heuristics can be responsive to the results of CSPS 40.

Conveniently, changes in the topology of massively parallel processor 10, or the replacement of one massively parallel processor 10 by another one can be easily represented by merely altering the domains, variables, and constraints representative of the massively parallel processor.

It is further noted that CSPS 40 can be provided with constraints of various types (hardware, wiring, business-related, etc.), thus allowing enforcement and optimization with respect to various aspects of the workload management.

Conveniently, scheduler 20 is adapted to provide to CSPS 40 multiple domains, variables, and constraints representative of massively parallel processor 10, of queued jobs (represented by job requests within queues 30(1)-30(J)) and of jobs being processed by massively parallel processor 10. CSPS 40 is adapted to generate a result representative of multiple jobs to be executed, at least partially in parallel, by multiple resources of the massively parallel processor.

It is noted that scheduler 20 can generate or receive a set of constraints that represent the capacity of massively parallel processor 10. Scheduler 40 can also receive or determine various constraints and domain dimensions in response to the topology of massively parallel processor.

Conveniently, scheduler 20 can receive various requests to execute jobs, stores the requests in multiple queues, and can generate domains, variables and constraints representative of these queued job requests, as well as jobs that are being executed by massively parallel processor.

It is noted that the jobs are not necessarily known in advance and that an iteration of job selection and resource allocation can be triggered by various events such as a completion of a job, a reception of a new queued job request and the like.

Conveniently, scheduler 20 can receive or determine one or more expiration thresholds to one or more jobs and the result provided by CSPS 40 can indicate if the one or more jobs were processed before the occurrence of corresponding one or more expiration threshold.

Conveniently, CSPS 40 can provide a satisfactory result that indicates all the jobs associated with an expiration thresholds can be completed before their corresponding expiration thresholds. The result also includes a suggested job selection and resource allocation of massively parallel processor 10. This suggested job selection and resource allocation provides values (which resources will be allocated for each selected job) to the various job variables. This suggested job selection and resource allocation can be applied.

CSPS 40 can also provide an unsatisfactory result indicating that the job selection and resource allocation problem cannot be mathematically satisfied.

CSPS 40 can further provide a questionable satisfaction result indicating that there is an uncertainty related to the satisfaction of the job selection and resource allocation problem. In other words, a questionable satisfaction result indicates that CSPS 40 does not know whether the job selection and resource allocation problem can be satisfied or not.

Conveniently, if CSPS 40 provides an unsatisfied result or a questionable satisfaction result, then scheduler 20 can amend at least one variable, and/or at least one constraint and/or at least one expiration threshold and then perform another job selection and resource allocation sequence that includes generating a result.

According to another embodiment of the invention CSPS 40 can receive a set of expected job selection and resource allocation characteristics (including for example, a set of prioritized soft constraints, a target cost function and the like) and the result generated by CSPS 40 includes a job selection and resource allocation that corresponds to these characteristics. For example, the job selection and resource allocation can satisfy the highest priority soft constraint or has the lowest (or highest) cost.

According to an embodiment of the invention, scheduler 40 can select a sub-set of queued job requests, either in a random manner or in another manner, and send to CSPS 40 variables constraints and domains representative of the subset of queued job requests. This can speed up the generation of the result.

Yet according to another embodiment of the invention, scheduler 20 can store the result provided by CSPS 40 and use the stored result during another iteration of the result generation. The stored result can, for example be used to select a sub-set of queued job requests.

Figure 2:
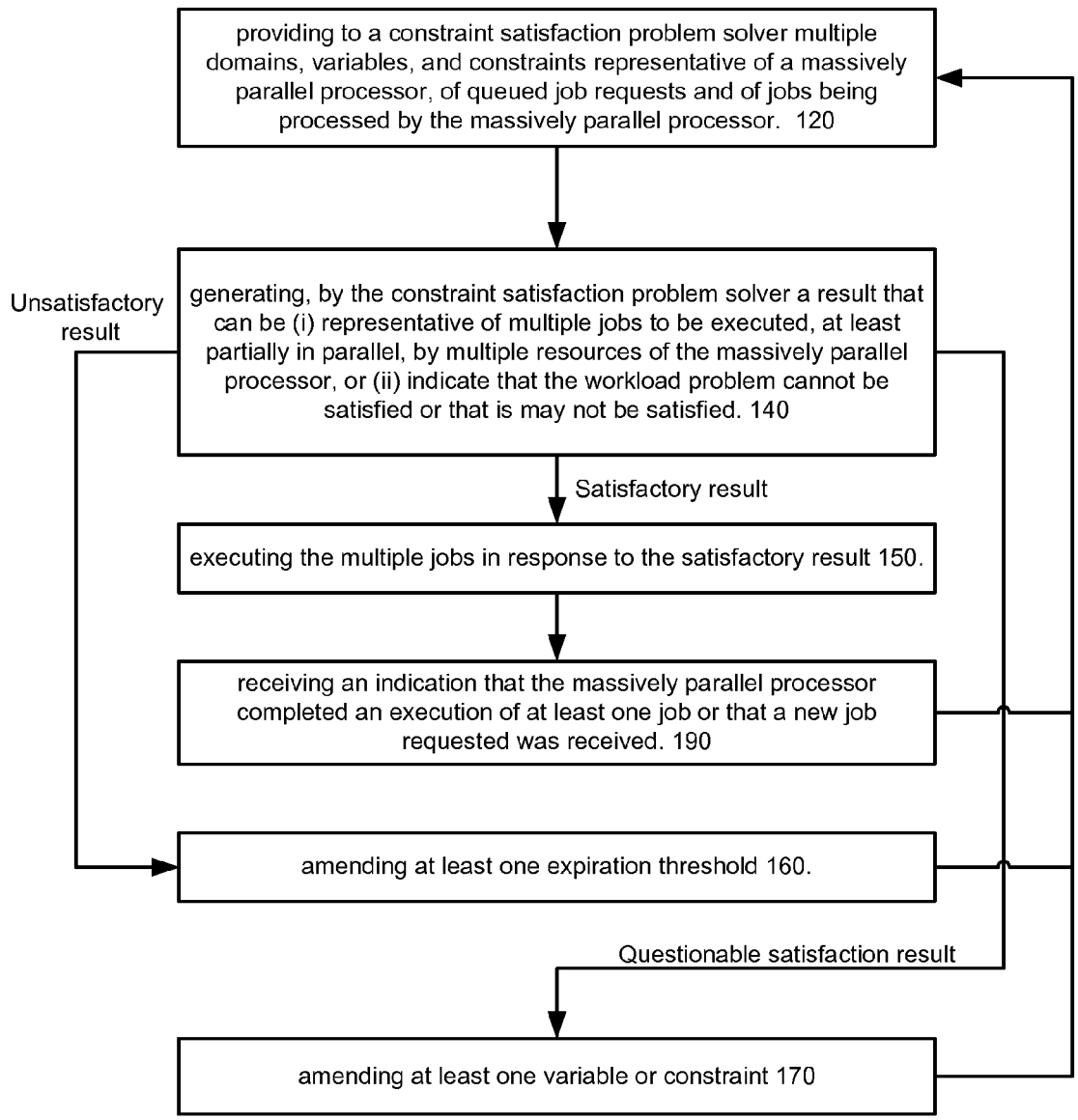
FIG. 2 illustrates a method for job selection and resource allocation of massively parallel processor, according to an embodiment of the invention.

FIG. 2 illustrates method 100 for job selection and resource allocation of massively parallel processor, according to an embodiment of the invention.

Method 100 starts by stage 120 of providing to a constraint satisfaction problem solver multiple domains, variables, and constraints representative of a massively parallel processor, of queued job requests and of jobs being processed by the massively parallel processor.

Stage 120 includes building a CSP model of the massively parallel processor, of queued job requests and of jobs being processed by the massively parallel processor.

Conveniently, the CSP model reflects a zero-time snapshot of the queued job requests, of jobs being executed by the massively parallel processor and of the massively parallel processor. It is noted that the CSP model of the massively parallel processor is not updated as frequently as the variables, constraints and domains that reflect the jobs.

Assuming that the massively parallel processor is represented by a three-dimensional space (box) that includes $L\_x$ resources at the x-direction, $L\_y$ resources at the y-direction and $L\_z$ resources at the z-direction, then stage 120 can include providing the mentioned below variables, domains and constraints.

Each job that is represented by a queued job request (job i) is characterized by three queued job spatial variables and a single queued job temporal variable. These three queued job spatial variables ($x\_i$, $y\_i$ and $z\_i$) represent the three-dimensional position of the queued job within the massively parallel processor.

The queued job temporal variable $t\_i$ indicates the time that job i enters the massively parallel processor for processing. The domains of the spatial queued job variables $x\_i$, $y\_i$ and $z\_i$ are $\{1, 2, 3, \ldots L\_x\}$, $\{1, 2, 3, \ldots L\_y\}$ and $\{1, 2, 3, \ldots L\_z\}$. The domain of the queued job temporal variable $t\_i$ are $\{0, 1, 2, 3 \ldots\}$. This domain can be infinite or bounded by a sufficiently large number. The units of this domain can represent the smallest time scale relevant to the workload problem, and can be defined by the user.

Each currently processed job (job j) is characterized by three currently processed job spatial variables and a single currently processed job temporal variable. The three currently processed job spatial variables ($x\_j$, $y\_j$ and $z\_j$) represent the three-dimensional position of the currently processed job within the massively parallel processor. The currently processed job temporal variable $t\_j$ equals zero.

The domains of the currently processed job spatial variables $x\_j$, $y\_j$ and $z\_j$ are all single-elements, representing the actual allocation in the x, y and z directions of the currently processed job in the massively parallel processor.

The domains of the currently processed job temporal variable $t\_j$ are single-elements that have a value that equals to zero.

For simplicity of explanation the following example will refer to three types of constraints. It is noted that the amount of constraint types can exceed and even well exceed three and that the constraints can reflect various parameters such massively parallel computer topology, business rules, customer needs and the like. A first type of constrain requires that a queued job should be processed by the massively parallel processor or in other words that the position and size of the queued job should be determined such as to fit within the three-dimensional space representative of the massively parallel processor: $x\_i+size\_x\_i<L\_x+1$; $y\_i+size\_y\_i<L\_y+1$, and $z\_i+size\_z\_i<L\_z+1$. It is noted that $size\_x\_i$, $size\_y\_i$ and $size\_z\_i$ represent the requested allocated resources for the execution of queued job i.

The second type of constraint requires that the execution of the queued job should end before an expiration threshold ($T\_M$). The expiration threshold can be defined by the user according to a prioritization scheme responsive to the importance and/or urgency of the job. Assuming that the queued job is expected to be processed during a period of $t\_i\_IN$ then the constraint has the following format: $t\_i+t\_i\_IN<T\_M$.

The third type of constraint requires that the resources of different jobs (job r and job s) do not overlap. These jobs can be queued jobs and/or currently processed jobs. In mathematical terms either one of the following should be fulfilled: (i) $x\_s>=x\_r+size\_x\_r$; (ii) $x\_r>=x\_s+size\_x\_s$; (iii) $y\_s>=y\_r+size\_y\_r$; (iv) $y\_r>=y\_s+size\_y\_s$; (v) $z\_s>=z\_r+size\_z\_r$, (vi) $z\_r>=z\_s+size\_z\_s$; (vii) $t\_s>=t\_r+duration\_r$, (viii) $t\_r>=t\_s+duration\_s$.

It is noted that $duration\_s$ is the expected duration of job s and that $duration\_r$ is the expected duration of job r.

Stage 120 is followed by stage 140 of generating, by the constraint satisfaction problem solver a result that can be (i) representative of multiple jobs to be executed, at least partially in parallel, by multiple resources of the massively parallel processor, or (ii) indicate that the workload problem cannot be satisfied or that it may not be satisfied.

Conveniently, stage 120 includes assigning at least one expiration threshold to at least one job and stage 140 include providing a result that indicates if at least one job was processed before the occurrence of at least one expiration threshold.

Stage 140 is followed by stage 150 of executing the multiple jobs in response to a satisfactory result.

Stage 150 can be followed by stage 190 of receiving an indication that the massively parallel processor completed an execution of at least one job or that a new job requested was received and jumping to stage 120.

If the result is an unsatisfactory result (indicating that the workload cannot be mathematically satisfied) then stage 140 is followed by stage 160 of amending at least one expiration threshold and jumping to stage 120.

According to an embodiment of the invention the expiration threshold can be amended by the user. According to another embodiment of the invention the expiration threshold is defined by method 100. The expiration thresholds can be set to a very large number that can virtually guarantee a satisfactory result. It is gradually decreased, during multiple iterations of method 100 until the first unsatisfactory result is provided. The last expiration thresholds which resulted in a satisfactory result is selected as an optimal expiration threshold. It is noted that different manners to scan (search) the optimal expiration threshold can be applied, including for example binary search.

If the result is a questionable satisfaction result then stage 140 is followed by stage 170 of amending at least one variable or constraint and jumping to stage 120. It is noted that stage 170 can include, alternatively or additionally altering at least one expiration threshold. Conveniently, if the result is a questionable satisfaction result than stage 140 can also be followed by stage 160.

According to another embodiment of the invention if the result is a questionable satisfaction result then stage 140 is followed by a stage (not shown) of selecting a sub-set of jobs and stage 120 includes providing to a constraint satisfaction problem solver multiple domains, variables, and constraints representative of a massively parallel processor, of a sub-set of queued job requests and of jobs being processed by the massively parallel processor.

Conveniently, stage 140 includes generating a result representative of multiple jobs to be executed, at least partially in parallel, by multiple resources of the massively parallel processor that is arranged as K-dimensional array of nodes, wherein K is a positive integer that exceeds two.

Figure 3:
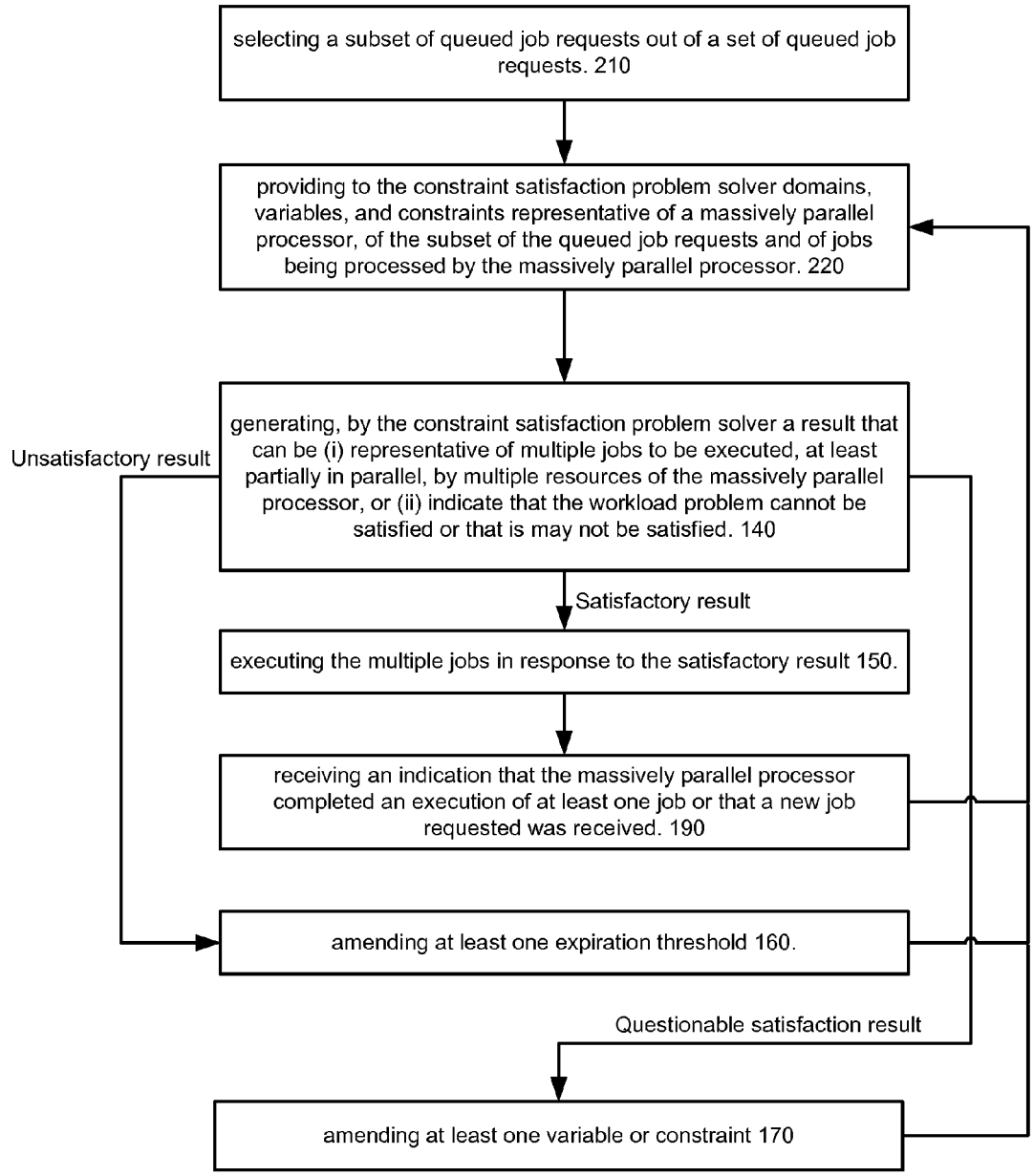
FIG. 3 illustrates a method for job selection and resource allocation of massively parallel processor, according to another embodiment of the invention.

FIG. 3 illustrates method 200 for job selection and resource allocation of massively parallel processor, according to an embodiment of the invention.

Method 200 differs from method 100 by starting at stage 210 of selecting a subset of queued job requests out of a set of queued job requests.

Stage 210 is followed by stage 220 of providing to the constraint satisfaction problem solver domains, variables, and constraints representative of a massively parallel processor, of the subset of the queued job requests and of jobs being processed by the massively parallel processor.

Stage 220 can be followed by stage 140 and then by one or more stages of stages 150-170.

Figure 4:
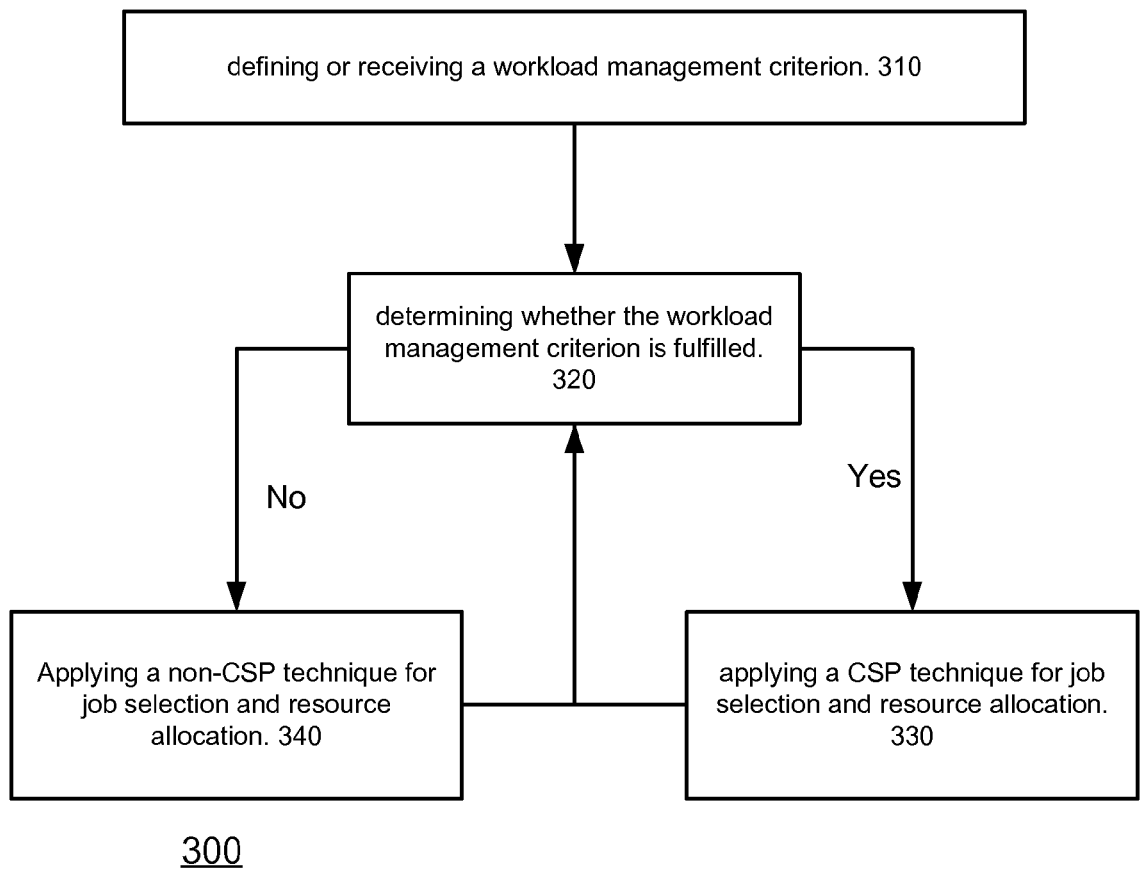
FIG. 4 illustrates a method for job selection and resource allocation of massively parallel processor, according to yet another embodiment of the invention.

FIG. 4 illustrates method 300 for job selection and resource allocation of massively parallel processor, according to an embodiment of the invention.

Method 300 starts by stage 310 of defining or receiving a workload management criterion.

Stage 310 is followed by stage 320 of determining whether the workload management criterion is fulfilled. If the answer is positive stage 320 is followed by stage 330 of applying a CSP technique for job selection and resource allocation. Stage 330 may include one or more stages of method 100, and alternatively or additionally, one or more stages of method 200. Stage 330 is followed by stage 320.

If the answer is negative then stage 330 is followed by stage 340 of applying a non-CSP technique for job selection and resource allocation. Stage 340 may include selecting a head-of-queue job to be executed by the massively parallel processor by a non-constraint satisfaction problem job selection process and selecting which resources of the massively parallel processor in response to the selection. Stage 340 is followed by stage 330.

Figure 5:
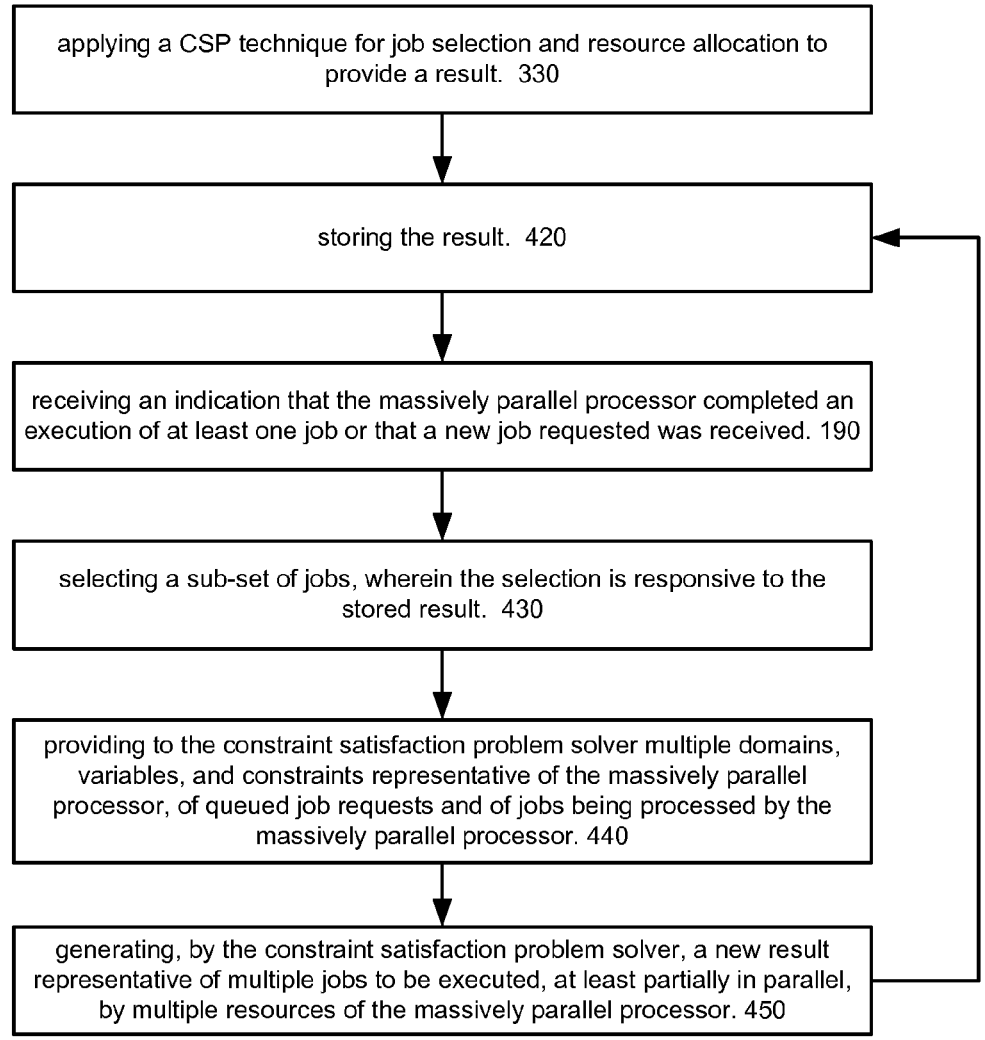
FIG. 5 illustrates a method for job selection and resource allocation of massively parallel processor, according to a further embodiment of the invention.

FIG. 5 illustrates method 400 for job selection and resource allocation of massively parallel processor, according to an embodiment of the invention.

Method 400 starts by stage 330 of applying a CSP technique for job selection and resource allocation to provide a first result.

Stage 330 may be followed by stage 420 of storing the first result. The result includes allocations of values to various job related variables.

Stage 420 is followed by stage 190 of receiving an indication that the massively parallel processor completed an execution of at least one job or that a new job requested was received.

Stage 190 is followed by stage 430 selecting a sub-set of jobs, wherein the selection is responsive to the first result.

Stage 430 may include: (i) defining or receiving a performance parameter P that limits the maximal number of jobs that should be taken into account during the job selection and resource allocation stage. (ii) If the number of queued job requests exceeds P then select randomly, or according to any heuristics, N-P queued job request. (iii) For each selected job determine if it appears in the first solution and if so—assign its variable the values assigned at the first result, else—remove the job from the selected set of results.

Stage 430 is followed by stage 440 of providing to the constraint satisfaction problem solver multiple domains, variables, and constraints representative of the massively parallel processor, of queued job requests and of jobs being processed by the massively parallel processor.

Stage 440 is followed by stage 450 of generating, by the constraint satisfaction problem solver, a second result representative of multiple jobs to be executed, at least partially in parallel, by multiple resources of the massively parallel processor.

Stage 450 can be followed by stage 420 of storing the second result.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention may be provided as a service to a customer over a network.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for job selection and resource allocation of massively parallel processors, the method comprises:
building a constraint satisfaction problem model, the constraint satisfaction problem model comprising multiple domains wherein each domain is of at least one dimension, multiple variables wherein each variable comprises at least one value within at least one of the domains, and multiple constraints expressed as mathematical relations between the variables, wherein the domains, variables and constraints are representative of: a massively parallel processor, queued requests wherein each of the queued request is associated with a job, and jobs being processed by the massively parallel processor;

providing the constraint satisfaction problem model to a constraint satisfaction problem solver; and generating, by the constraint satisfaction problem solver a satisfactory result, said generating based on the constraint satisfaction problem model, wherein the satisfactory result is representative of at least two jobs associated with at least two of the queued requests, the at least two jobs selected to be executed, at least partially in parallel, by multiple resources of the massively parallel processor, and wherein the result comprises values indicating resources allocated for each of the at least two jobs.

2. The method according to claim 1 further comprising assigning at least one expiration threshold to at least one job and wherein result indicates if the at least one job was processed before the occurrence of the at least one expiration threshold.

3. The method according to claim 2 further comprising generating a non-satisfactory result;
amending at least one variable of constraints; and
repeating the stages of providing.

4. The method according to claim 2 further comprising amending at least one expiration threshold and repeating the stages of providing and generating.

5. The method according to claim 1 further comprising selecting a subset of queued job requests and providing to the constraint satisfaction problem solver domains, variables, and constraints representative of a massively parallel processor, of the subset of the queued job requests and of jobs being processed by the massively parallel processor.

6. The method according to claim 1 further comprising:
performing the stages of providing and generating when a workload management selection criterion is fulfilled; and,
if the workload management selection criterion is not fulfilled, selecting a head-of-queue job to be executed by the massively parallel processor by a non-constraint satisfaction problem job selection process and selecting which resources of the massively parallel processor in response to the selection.

7. The method according to claim 1 wherein the generating comprises generating a result representative of multiple jobs to be executed, at least partially in parallel, by multiple resources of the massively parallel processor that is arranged as K-dimensional array of nodes, wherein K is a positive integer that exceeds two.

8. The method according to claim 1 further comprising executing the multiple jobs in response to the result.

9. The method according to claim 1 wherein the method comprises receiving an indication that the massively parallel processor completed an execution of at least one job and repeating the stages of providing and generating.

10. The method according to claim 1 further comprising executing the stages of providing and generating to provide a first result; storing the first result; providing the first result, multiple domains, variables, and constraints representative of the massively parallel processor, of queued job requests and of jobs being processed by the massively parallel processor; and generating, by the constraint satisfaction problem solver a second result representative of multiple jobs to be executed, at least partially in parallel, by multiple resources of the massively parallel processor.

11. The method according to claim 1 further comprising defining a set of expected job selection and resource allocation characteristics; and wherein the generating comprises generating a result in response to the job selection and resource allocation characteristics.

12. A computer program product comprising a non-transitory computer usable medium including a computer readable program, wherein the computer readable program when executed on a computer causes the computer to:
build a constraint satisfaction problem model, the constraint satisfaction problem model comprising multiple domains wherein each domain is of at least one dimension, multiple variables wherein each variable comprises at least one value within at least one of the domains, and multiple constraints expressed as mathematical relations between the variables, wherein the domains, variables and constraints are representative of:
a massively parallel processor, queued requests wherein each of the queued request is associated with a job, and jobs being processed by the massively parallel processor;

provide the constraint satisfaction problem model to a constraint satisfaction problem solver;

generate, by the a constraint satisfaction problem solver and based on the constraint satisfaction problem model, a satisfactory result, wherein the satisfactory result is representative of at least two jobs associated with at least two of the queued requests, the at least two jobs selected to be executed, at least partially in parallel, by multiple resources of the massively parallel processor, and wherein the result comprises values indicating resources allocated for each of the at least two jobs.

13. The computer program product according to claim 12, wherein the computer readable program when executed on a computer causes the computer to assign at least one expiration threshold to at least one job and wherein the result indicates if the at least one job was processed before the occurrence of the at least one expiration threshold.

14. The computer program product according to claim 13, wherein the computer readable program when executed on a computer causes the computer to:
generate a non-satisfactory result;
amend at least one variable of constraints; and
repeating the stages of providing.

15. The computer program product according to claim 13, wherein the computer readable program when executed on a computer causes the computer to amend at least one expiration threshold and repeating the stages of providing and generating.

16. The computer program product according to claim 12, wherein the computer readable program when executed on a computer causes the computer to select a subset of queued job requests and to apply the constraint satisfaction problem solving process on the subset of the queued job requests.

17. The computer program product according to claim 12, wherein the computer readable program when executed on a computer causes the computer to:
provide multiple domains and to generate a result using a constraint satisfaction problem solving process, when a workload management selection criterion is fulfilled; and if the workload management selection criterion is not fulfilled, to select a head-of-queue job to be executed by the massively parallel processor by a non-constraint satisfaction problem job selection process and select which resources of the massively parallel processor in response to the selection.

18. The computer program product according to claim 12, wherein the computer readable program when executed on a computer causes the computer to generate a result representative of multiple jobs to be executed, at least partially in parallel, by multiple resources of the massively parallel processor that is arranged as K-dimensional array of nodes, wherein K is a positive integer that exceeds two.

19. The computer program product according to claim 12, wherein the computer readable program when executed on a computer causes the computer to execute the multiple jobs in response to the result.

20. The computer program product according to claim 12, wherein the computer readable program when executed on a computer causes the computer to generate a result in response to job selection and resource allocation characteristics.

* * * * *